Figure 1:
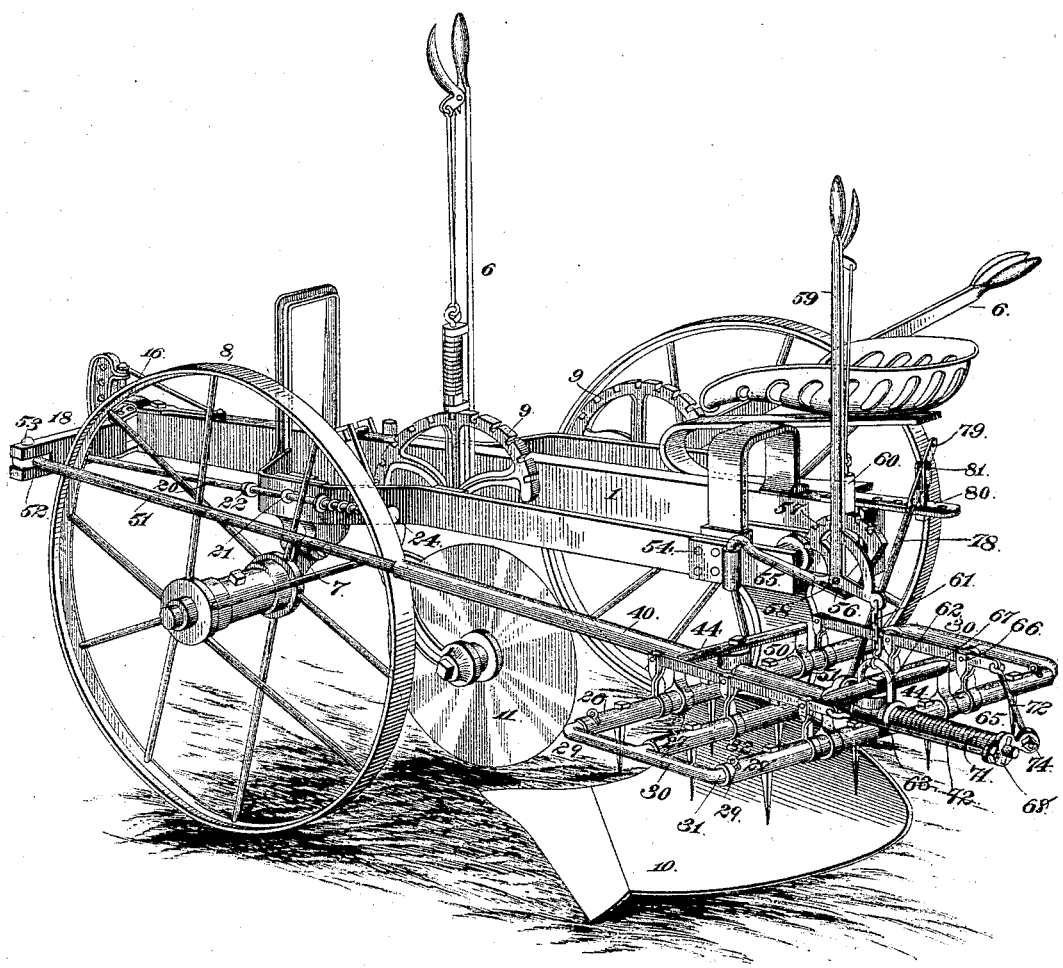

(No Model.) 2 Sheets—Sheet 1.

S. P. YODER.
HARROW ATTACHMENT FOR SULKY PLOWS.

No. 485,830. Patented Nov. 8, 1892.

Witnesses Inventor
Simon P. Yoder
By his Attorneys, (No Model.) 2 Sheets—Sheet 2.
S. P. YODER.
HARROW ATTACHMENT FOR SULKY PLOWS.
No. 485,830. Patented Nov. 8, 1892.
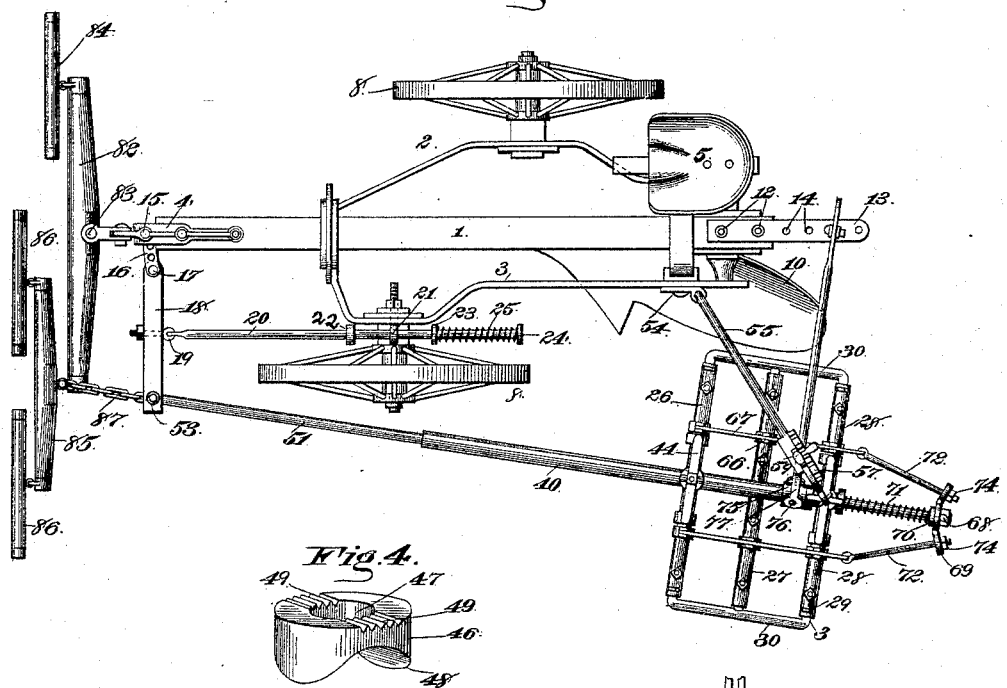
Witnesses  
Inventor  
Simon P. Yoder  
By his Attorneys,

UNITED STATES PATENT OFFICE.

SIMON P. YODER, OF LIGONIER, INDIANA.

HARROW ATTACHMENT FOR SULKY-PLOWS.

SPECIFICATION forming part of Letters Patent No. 485,830, dated November 8, 1892.

Application filed April 13, 1892. Serial No. 429,046. (No model.)

*To all whom it may concern:*

Be it known that I, SIMON P. YODER, a citizen of the United States, residing at Ligonier, in the county of Noble and State of Indiana, have invented a new and useful Harrow Attachment for Sulky-Plows, of which the following is a specification.

My invention relates to a harrow attachment for sulky-plows; and the objects in view are to provide a simple and convenient construction of harrow adapted to be conveniently attached to the mold-board side of a sulky-plow and to provide a simple and convenient means for gearing the same to the plow and for permitting of an independent movement thereof.

Other objects and advantages of the invention will appear in the following description, and the novel features thereof will be particularly pointed out in the claims.

Referring to the drawings, Figure 1 is a perspective of a sulky-plow having a harrow attachment embodying my invention. Fig. 2 is a plan view of the same. Fig. 3 is a central longitudinal section of the harrow. Fig. 4 is a detail in perspective of one of the clamping-washers hereinafter described.

Like numerals of reference indicate like parts in all the figures of the drawings.

It will be understood that my attachment is designed to be used in connection with any style of sulky-plow, and I have herein illustrated one well-known form merely for the purpose of showing the attachment in operative position. In the present instance, 1 designates the main beam of the plow, and to the opposite sides of the same are securely bolted the angular bearing-frames 2 and 3. The clevis 4 is at the front end of the beam 1, the seat 5 near the rear end, and the levers 6 for controlling the axles 7 of the ground-wheels 8 are mounted on the frames 2, said levers being in easy reach of the seat 5 and adapted to be locked in any of their adjustments by the locking-standards 9.

10 designates the plow, and 11 the usual colter. To the rear end of the beam 1 there is bolted, as at 12, a rearwardly-disposed plate 13, having a series of adjusting-holes 14. Loosely pivoted by the clevis-bolt 15 to the clevis is a pair of links 16, in which is adjustably secured by a bolt 17 and capable of a swinging movement an arm or equalizing-bar 18. This bar is provided at about its center and at its rear side with an eyebolt 19, and in the same is loosely connected the front end of a draft-rod 20. Near its rear end the rod passes through an eyebolt 21, which projects from the side frame 3. A fixed stop 22 is located upon the rod 20 some distance in front of the eyebolt 21, and a washer 23 is located upon the rod in rear of the eyebolt. The rod terminates at its rear end in a head 24, and a coiled spring 25 encircles the rod between the head and washer 23, said spring serving as a cushion when the washer is drawn against the eyebolt 21 by a forward swing of the arm 18.

The harrow-frame comprises a series of hollow transverse harrow-bars, which, beginning with the front bar, I will designate as 26, 27, and 28, though it will be understood that a greater number may be employed. These bars, besides being hollow, are cylindrical exteriorly, and are provided near each of their ends with curved slots 29. The harrow further comprises opposite connecting end bars 30, which are provided at their extremities and centers with inwardly-bent ends or tenons 31, which take into the cylindrical open ends of the harrow-bars 26, 27, and 28. Studs or stops 32 extend through the slots from the tenons 31 and limit the movements of the tubular harrow-bars. These harrow-bars are provided upon their under sides with square openings 33 and upon their upper sides diametrically above the same with round openings 34. A series of teeth are secured to the harrow-bars, and each tooth consists of a lower squared body portion 35, widened to form a shoulder 36 a short distance below its upper end, above the same provided with a squared tenon 37, fitting the opening 33, and beyond this with a cylindrical portion or end 38, which fits and extends beyond the perforation 34. These cylindrical portions of the teeth are threaded, and nuts 39 are mounted thereon, whereby the tubular harrow-bars are snugly bound between the shoulders 36 and nuts of the teeth.

40 designates a cylindrical sleeve or tube mounted upon the transverse harrow-bars above their centers and longitudinally disposed. This sleeve, above the front and rear bars, is embraced by eyes 41, from the upper sides of which rise threaded shanks 42. These shanks pass through a perforation 43, formed in each of a pair of transverse yoke-bars 44, and above the bars nuts 45 are located on the threaded shanks. Below the bars 44 and encircling the eyes 41 is a pair of washers 46, which I have shown in detail in Fig. 4 of the drawings. Each washer is provided with a central annular opening 47, has its under side concaved to form at its outer edge an angular shoulder or bite, and upon its upper side is provided with a series of teeth 49. The shoulder or edge 48 clamps tightly upon the tube 40, and the under sides of the yoke-bars are engaged by the roughened or toothed portions 49. The ends of the yoke-bars are secured to the upper ends of loops 50, which at their lower ends form eyes 51 and receive loosely the cylindrical tubular harrow-bars 26, 27, and 28. A rod 51 is mounted loosely in the tube 40, extends at its front end beyond the same, and takes into a bifurcation 52, formed in the free end of the equalizing-arm 18, where it is pivoted by a bolt 53.

In a bearing-bracket 54, secured to the rear end and at the outer side of the frame 3, is a horizontally-disposed swinging L-shaped arm 55, the same terminating at its free end in a plate 56, from which rises a curved notched locking sector or standard 57. Fulcrumed upon the base of this standard, as at 58, is the bell-crank lever 59, to which is secured the spring-actuated bolt 60, designed to engage with any one of the notches formed in the locking standard or sector 57. From the lower end of the bell-crank lever 59 depends a short chain 61, and the same connects with an inverted-U-shaped bail 62, which terminates in eyes 63. The bail embraces or arches over the rear yoke-bar 44, and its eyes 63 loosely receive the tube 40. Short vertical standards rise from each of the harrow-bars 26, 27, and 28, and are designated as 65. A series of these standards are located at each side of the center of the harrow-section, and they are rigidly secured to the bars. The standards of each series are connected by a longitudinal connecting-bar 67, said standards being pivoted to the bar, as at 68. The rear end of the rod 51 is provided with a stop or head 68, which may be a nut or pin, and in front of the same there is mounted on the rod a yoke-plate 69, perforated at opposite sides of the rod 51. In front of the yoke-plate 69 a washer 70 is mounted on the rod, and between the washer and the rear end of the tube 40, which latter is flared or spread to form a head 70, there is interposed a coiled spring 71 of considerable tensile strength. 72 designates a pair of connecting rods or links, the front ends of which are coupled with eyes 73 at the rear ends of the bars 67, and the rear ends of which are passed through the eyes or perforations formed in the yoke-plate 69, said links 72 being threaded and provided with nuts 74 in rear of the yoke-plate.

A sleeve 75 is mounted on the tube 40 and is provided at diametrically-opposite sides with trunnions 76. These trunnions are loosely connected with the lower bifurcated end 77 of an inclined rod 78, whose upper end is flattened and at intervals perforated at 79. A yoke-bolt 80 is adjustably mounted in any one of the holes 14 of the plate 13, and the upper bifurcated portion of this bolt receives the upper flattened and perforated end 79 of the rod 78, a bolt 81 being passed through the bifurcation of the yoke-bolt and one of the perforations 79.

82 designates the evener, and the same is by the clevis-bolt 83 pivoted to the clevis. To one end of the evener—in this instance the right end or landside of the plow—is the singletree 84, and at the opposite end—that is, the mold-board side or left of the plow—is the doubletree 85, having at its ends the singletrees 86. A short draft-chain 87 leads from the front end of the rod 51 to the point of connection between the evener or equalizer 82 and the doubletree 85.

It will be obvious from the foregoing description that through the medium of the rod 78, the bolt 81, the adjusting-plate 13, and its perforations the harrow-section as a whole may be set at different distances from the plow 10, and that by reason of the rod 78 being loosely connected at its lower end to the harrow-frame said frame may, so far as the rod is concerned, move longitudinally or vertically. Such vertical movement of the harrow is caused by the lever 59, whereby the harrow may be raised or lowered into and out of operative position. The arm 55, upon which the lever 59 is mounted, also permits of any lateral movement of the harrow and by the loose connecting-chain 61 of any longitudinal movement. Although the spring 71, pressing against the rear end of the tube 40, and the yoke-plate 69 serves to draw the connecting-rods 67 to the rear, and thus rearwardly rotate the harrow-bars until the front ends of their slots are against the stops 32, and thus the teeth are normally maintained vertical, yet it will be seen that should any of the teeth meet with an obstruction sufficient to overcome the tension of the spring the bars 26, 27, and 28 would all simultaneously, together with their teeth, move so that the teeth would occupy an inclined position and permit of the same riding over the obstruction. The spring is only employed when the ground is first being cultivated or is exceedingly lumpy or stiff, and when it is under a high degree of cultivation and only a light harrowing necessary I may remove the spring, pushing the rod 51 forwardly, so that the yoke-plate will rest against the rear end of the tube 40. Such movement will cause the connecting-rods 67 to move to the front, and with them, through the medium of the standard 64, will be moved or partially rock the harrow-bars, so that they are inclined, made rigid, and assume the position shown in Fig. 3.

From the foregoing description, in connection with the accompanying drawings, it will be seen that I have provided a harrow attachment very complete in itself and adapted for ready application to the framework of any ordinary sulky-plow, whereby as the plowing operation is being carried on so, also, is the harrowing operation. In other words, as the soil is turned by the mold-board it is thoroughly harrowed.

Having described my invention, what I claim is—

1. The harrow-section consisting of the series of tubular harrow-bars having depending teeth and at their ends provided with curved slots, the opposite longitudinal end bars having tenons taking into the slots, and stops mounted on the tenons and passing through the slots, substantially as specified.

2. The combination, with the series of cylindrical harrow-bars, front and rear pairs of eyes in which said bars are mounted and adapted to rock, yoke-bars connecting the eyes, a tube connected to the under sides of the yoke-bars, a draft-rod passed through the tube and extending beyond the rear end of the same, a yoke-plate mounted on the rod, and a coiled spring interposed between the end of the tube and yoke-plate and adapted to spread the two, of longitudinal side bars forming journals for the harrow-bars, standards rigidly mounted on each of said bars, connecting-rods pivoted to the standards, and connections between the rear ends of the connecting-bars and stop at the rear end of the rod, substantially as specified.

3. The combination, with the cylindrical harrow-bars, the bearing-standards 50, rising therefrom at opposite sides of the centers of the bars, yoke-bars connecting the bearing-standards, a tube located between the standards and resting on the harrow-bars, eyebolts encircling the tube and passed through perforations in the yoke-bars, the concaved washers encircling the eyebolts mounted on the tube and having upper roughened faces, and clamping-nuts on the upper ends of the eyebolts above the yoke-bars, of the end bars 30, having tenons 31, forming bearings for the ends of the harrow-bars, the opposite series of rigid standards rising from the harrow-bars, the connecting-bars 67, pivoted to said standards and extending in rear of the same, the draft-rod mounted in the tubular rod and extending in rear of the same, where it terminates in a head, a perforated yoke-plate mounted on the rod in front of the head, a coiled spring upon the rod between the tube and head, teeth depending from the harrow-bars, and connecting-links between the connecting-rods and yoke-plate, substantially as specified.

4. The combination, with the sulky-plow frame comprising the central beam and the perforated plate 13, projecting from the rear end thereof, of the harrow-section, yielding draft connections between the same and the front end of the frame, a yoke-bolt mounted pivotally and removably in the perforations of the plate 13, and a rod adjustably bolted at its upper end to the yoke-bolt and at its lower end loosely connected with the harrow-section, substantially as specified.

5. The combination, with the sulky-plow frame having a bearing-bracket, an inverted-L-shaped arm hinged therein and terminating at its outer end in a toothed locking standard or sector, and a bell-crank lever fulcrumed in the base of the standard and having a bolt for engaging the teeth thereof, of a harrow-section, loose connections between the lower end of the bell-crank lever and section, and draft-connections between the front end of the sulky-plow frame, substantially as specified.

6. The combination, with the sulky-plow frame having a bearing-bracket, an inverted-L-shaped arm hinged therein and terminating at its outer end in a toothed locking standard or sector, and a bell-crank lever fulcrumed in the base of the standard and having a bolt for engaging the teeth thereof, of a harrow-section, loose connections between the lower end of the bell-crank lever and section, an adjusting-rod connecting the section and rear end of the sulky-frame, and draft connections between the front end of the frame and section, substantially as specified.

7. The combination, with the central beam of a sulky-plow, an equalizing-arm pivoted at its inner end thereto, and equalizing devices connected to the arm and beam, of a harrow-section comprising a series of rocking bars, a tube to which the bars are loosely connected, a rod passed through the tube, connected at its front end to the equalizing-arm and terminating at its rear end in a head, a yoke mounted on the rear end of the rod, a coiled spring mounted on the rod between the yoke and tube, a series of standards rising from the harrow-bars, rods pivotally connecting the same, and links between the rear ends of the rods and yoke, said links having their rear ends threaded and passed through perforations in the yoke and provided with adjusting-nuts, substantially as specified.

8. The combination, with the central beam and side frame of the sulky-plow, the equalizing-arm loosely pivoted to the front end of the beam, the eyebolt projecting from the side of the frame, the rod 20, loosely connected to the arm, passing rearwardly through the eyebolt, terminating at its rear end in a head and provided in front of the eyebolt with a stop, a washer on the rod in rear of the eyebolt, and a spring coiled upon the rod between the washer and head, of the harrow-section and connecting devices between the free end of the arm and the section, substantially as specified.

In testimony that I claim the foregoing as my own I have hereto affixed my signature in the presence of two witnesses.

SIMON P. YODER.

Witnesses:
 JOHN L. WOLF,
 WALTER WOLF.